(12) United States Patent
Choi et al.

(10) Patent No.: US 9,060,658 B2
(45) Date of Patent: Jun. 23, 2015

(54) MOBILE ROBOT WITH SINGLE CAMERA AND METHOD FOR RECOGNIZING 3D SURROUNDINGS OF THE SAME

(75) Inventors: Yoo-Jin Choi, Seoul (KR); Young-Gie Kim, Seoul (KR); Jeong-Suk Yoon, Seoul (KR); Seong-Soo Lee, Seoul (KR); Yie-Bin Kim, Seoul (KR); Seung-Min Baek, Seoul (KR); Sang-Ik Na, Seoul (KR); Su-Uk Choe, Seoul (KR); Dong-Hoon Yi, Seoul (KR); Jei-Hun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 541 days.

(21) Appl. No.: 13/262,192

(22) PCT Filed: Mar. 12, 2010

(86) PCT No.: PCT/KR2010/001556
§ 371 (c)(1),
(2), (4) Date: Sep. 29, 2011

(87) PCT Pub. No.: WO2010/114235
PCT Pub. Date: Oct. 7, 2010

(65) Prior Publication Data
US 2012/0019627 A1    Jan. 26, 2012

(30) Foreign Application Priority Data
Mar. 31, 2009    (KR) .......................... 10-2009-0027786

(51) Int. Cl.
*G06K 9/00*         (2006.01)
*A47L 9/00*         (2006.01)
(Continued)

(52) U.S. Cl.
CPC .............. *A47L 9/009* (2013.01); *G01S 15/931* (2013.01); *G05D 1/0246* (2013.01); *G05D 2201/0203* (2013.01); *A47L 2201/04* (2013.01); *G01S 2015/938* (2013.01); *G05D 1/0274* (2013.01)

(58) Field of Classification Search
CPC ... B62D 57/032; G06T 7/0075; H04W 64/00; G05D 1/0246
USPC ........ 700/253; 382/154, 104, 103; 455/456.1; 701/28
See application file for complete search history.

(56) References Cited

U.S. PATENT DOCUMENTS

| | | | | |
|---|---|---|---|---|
| 5,999,642 | A  * | 12/1999 | Gilliland | 382/154 |
| 8,009,897 | B2 * | 8/2011 | Xu et al. | 382/154 |
| 2003/0212472 | A1* | 11/2003 | McKee | 700/245 |

(Continued)

FOREIGN PATENT DOCUMENTS

| | | |
|---|---|---|
| KR | 10-2002-0081035 | 10/2002 |
| KR | 10-0560966 | 3/2006 |

(Continued)

*Primary Examiner* — Chikaodili E Anyikire
(74) *Attorney, Agent, or Firm* — McKenna Long & Aldridge LLP

(57) ABSTRACT

Disclosed are a mobile robot with a single camera capable of performing a cleaning process with respect to surroundings, and capable of more precisely making a 3D map of the surroundings including a plurality of feature points, and a method for recognizing 3D surroundings of the same. According to the method, images of the surroundings are captured, and a preset number of particles with respect to feature points of a first image are projected to a second image based on matching information of feature points extracted from the two images sequentially captured, thereby extracting 3D information of the surroundings.

19 Claims, 5 Drawing Sheets

(51) Int. Cl.
*G01S 15/93* (2006.01)
*G05D 1/02* (2006.01)

(56) References Cited

U.S. PATENT DOCUMENTS

2006/0056677 A1* 3/2006 Tani .............................. 382/153
2007/0262884 A1* 11/2007 Goncalves et al. ...... 340/995.24
2008/0155768 A1* 7/2008 Ziegler et al. ........................ 15/4
2010/0070125 A1* 3/2010 Lee et al. ........................ 701/28
2010/0085358 A1* 4/2010 Wegbreit et al. .............. 345/420

FOREIGN PATENT DOCUMENTS

| KR | 10-2006-0129960 | 12/2006 |
| KR | 10-2007-0026912 A | 3/2007 |
| KR | 10-0792852 | 1/2008 |
| KR | 10-2008-0075730 | 8/2008 |

* cited by examiner

MOBILE ROBOT WITH SINGLE CAMERA AND METHOD FOR RECOGNIZING 3D SURROUNDINGS OF THE SAME

This Application is a 35 U.S.C. §371 National Stage Entry of International Application No.: PCT/KR2010/001556, filed on Mar. 12, 2010, which claims priority to Korean Patent Application No: 10-2009-027786, filed on Mar. 31, 2009, both of which are hereby incorporated by reference in their entirety for all purposes as if fully set forth herein.

TECHNICAL FIELD

The present invention relates to a mobile robot with a single camera and a method for recognizing 3-dimensional (3D) surroundings of the same, and particularly, to a mobile robot with a single camera capable of precisely extracting 3D information of surroundings, by re-projecting particles set at a previous image frame to a next frame based on matching information of feature points of the two neighboring image frames, and a method for recognizing 3D surroundings of the same.

BACKGROUND ART

A mobile robot indicates an autonomous cleaner capable of performing an autonomous cleaning process by using a charged battery as a driving source, and by moving along an inputted program.

A user does not directly perform a cleaning process with moving a cleaner, but makes the mobile robot perform an autonomous cleaning process by manipulating the mobile robot with using a remote control or simple driving buttons. This may allow the user to make less efforts in performing a cleaning process, and may save cleaning time.

This mobile robot is provided with an obstacle sensor configured to detect an obstacle positioned on a movement path. Upon detecting a front obstacle by the obstacle sensor, the mobile robot moves to avoid the detected obstacle.

DISCLOSURE OF INVENTION

Technical Problem

The conventional mobile robot performs a cleaning process by passively recognizing peripheral regions (surroundings). For example, the conventional mobile robot recognizes a closed wall or an opened space with using a 1-dimensional sensor or a 2-dimensional sensor, or recognizes a nearby obstacle.

Solution to Problem

Therefore, an object of the present invention is to provide a mobile robot with a single camera capable of precisely extracting 3D information of surroundings, by re-projecting particles set at a previous image frame to a next frame based on matching information of feature points of the two neighboring image frames, and a method for recognizing 3D surroundings of the same.

To achieve these and other advantages and in accordance with the purpose of the present invention, as embodied and broadly described herein, there is provided a mobile robot with a single camera, comprising: a detection unit having a single camera, and configured to sequentially capture images including a ceiling with using the single camera in a moving or stopped state on a cleaning region; and a control unit configured to extract feature points from the sequentially-captured images, to extract 3D information of a substantial feature point of surroundings, and thereby to make a 3D map.

The control unit may be configured to generate a preset number of particles on a virtual line based on matching information of the same feature points of two neighboring images, the virtual line passing through a feature point of a first image of the two neighboring images and a center of the camera, and may be configured to extract 3D information of a substantial feature point of the surroundings by projecting the generated particles to a second image of the two neighboring images.

The control unit may be configured to estimate a position of the mobile robot in the surroundings and to make a 3D map by repeatedly performing, on the cleaning region, the step of generating a preset number of particles on a virtual line based on matching information of the same feature points of two neighboring images, the virtual line passing through a feature point of a first image of the two neighboring images and a center of the camera, and the step of extracting 3D information of a substantial feature point of the surroundings by projecting the generated particles to a second image of the two neighboring images.

The control unit may include a feature point extractor configured to extract feature points from the captured images; a particle generator configured to generate feature point particles from a first image based on feature points extracted from two neighboring images sequentially captured; and a 3D information processor configured to make a 3D map by extracting 3D information of the feature point of the first image by projecting the generated particles to a second image.

To achieve these and other advantages and in accordance with the purpose of the present invention, as embodied and broadly described herein, there is also provided a method for recognizing 3D surroundings of a mobile robot with a single camera, the method comprising: a feature point processing step of calculating matching information of the same feature points of two neighboring images, by extracting a plurality of feature points from each surrounding image sequentially captured with using the single camera; generating a preset number of particles on a virtual line based on the matching information, the virtual line passing through a feature point of a first image of the two neighboring images and a center of the camera; extracting 3D information of a substantial feature point of the surroundings by projecting the generated particles to a second image of the two neighboring images; and estimating a position of the mobile robot in the surroundings and making a 3D map based on the 3D information.

In the step of making a 3D map, a position of the mobile robot in the surroundings may be estimated, and a 3D map may be made by repeatedly performing, on the cleaning region, the feature point processing step, the particle generating step, and the 3D information extracting step.

The foregoing and other objects, features, aspects and advantages of the present invention will become more apparent from the following detailed description of the present invention when taken in conjunction with the accompanying drawings.

Advantageous Effects of Invention

According to the method, 3D information of the surroundings may be precisely extracted, by re-projecting particles set at a previous image frame to a next frame based on matching information of feature points of two neighboring image frames.

BEST MODE FOR CARRYING OUT THE INVENTION

Reference will now be made in detail to the preferred embodiments of the present invention, examples of which are illustrated in the accompanying drawings.

Hereinafter, preferred embodiments of a mobile robot according to the present invention will be explained in more detail with reference to FIGS. 1 and 3.

Figure 1:
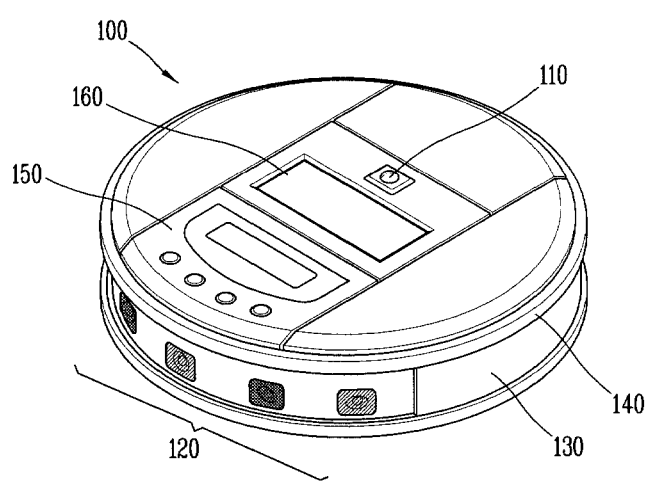
FIG. 1 is a schematic perspective view of a mobile robot with a single camera according to one embodiment of the present invention.
Figure 2:
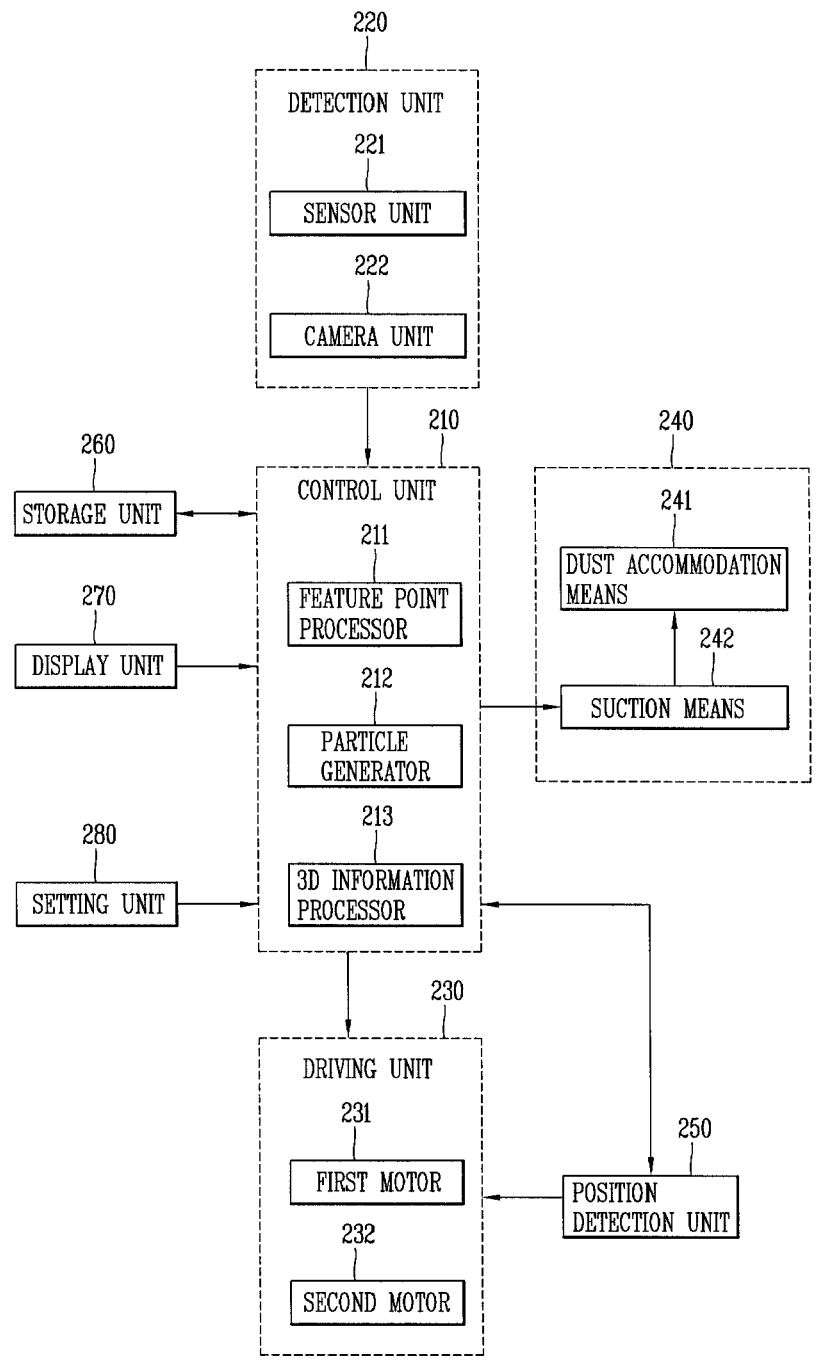
FIG. 2 is a block diagram of a control unit of the mobile robot with a single camera according to one embodiment of the present invention.

FIG. 1 is a schematic perspective view of a mobile robot with a single camera according to one embodiment of the present invention, and FIG. 2 is a block diagram of a control unit of the mobile robot with a single camera according to one embodiment of the present invention.

As shown in FIG. 1, the mobile robot 100 includes a case 140 which forms the appearance; and a front sensor 120 disposed to correspond to an outer side surface of the case 140, and including two or more signal transmitters and two or more signal receivers. Here, the case 140 is formed in a circular disc shape having a predetermined height. The front sensor 120 serves to detect a distance between the mobile robot 1 and an indoor wall or obstacle. For instance, the front sensor may be implemented as a ultrasonic wave sensor. The case 140 is provided with a bumper 130 configured to attenuate an impact generated when colliding with an obstacle.

Furthermore, the mobile robot 100 is provided with a camera 110 at an upper front side thereof so as to capture images of a region to be cleaned, or a movement region. The camera 110 is installed such that the mobile robot 1 captures images of front and upper sides of its movement path. In the preferred embodiment, the camera is fixedly installed. However, the camera may be installed so as to be moveable by a predetermined angle in right and left directions, or in upper and lower directions.

Referring to FIGS. 1 and 2, the mobile robot 100 comprises a case 140; a driving unit 230 including an agitator, driving wheels, and first and second motors 231, 232 configured to transmit a driving force to the driving wheels; a suction unit 240, a manipulation unit 150, a battery (not shown), a detection unit 220, and a control unit 210.

Referring to FIG. 2, the mobile robot with a single camera comprises: a detection unit 220 having a single camera, and configured to sequentially capture images including a ceiling with using the single camera in a moving or stopped state on a cleaning region; and a control unit 210 configured to extract feature points from the sequentially-captured images, to extract 3D information of a substantial feature point of surroundings, and thereby to make a 3D map.

The control unit 210 is configured to generate a preset number of particles on a virtual line based on matching information of the same feature points of two neighboring images, the virtual line passing through a feature point of a first image of the two neighboring images and a center of the camera, and is configured to extract 3D information of a substantial feature point of the surroundings by projecting the generated particles to a second image of the two neighboring images.

The control unit 210 is configured to estimate a position of the mobile robot in the surroundings and to make a 3D map by repeatedly performing, on the cleaning region, the step of generating a preset number of particles on a virtual line based on matching information of the same feature points of two neighboring images, the virtual line passing through a feature point of a first image of the two neighboring images and a center of the camera, and the step of extracting 3D information of a substantial feature point of the surroundings by projecting the generated particles to a second image of the two neighboring images.

The mobile robot with a single camera according to the present invention further comprises a position detection unit 250 configured to detect position information varied according to movement of the mobile robot 100; and a storage unit 260 configured to store therein an operation program for driving the mobile robot, and configured to store at least one of image information sensed by the detection unit 220, feature points extracted from the image information, position information of the mobile robot 100 detected by the position detection unit 250, estimation information, and the 3D map.

The detection unit 220 includes a sensor unit 221 configured to emit a signal for sensing an obstacle, and to sense the obstacle or a movement path by receiving a signal reflected from the obstacle; and a camera unit 222 configured to capture images in a forward direction of the mobile robot 100.

The sensor unit 221 includes a front sensor 120 configured to sense a front object, a side wall sensor (not shown) arranged on a side surface of the mobile robot 100 and sensing a wall surface, an IR sensor (not shown) configured to sense the charging plate so as to charge the battery, etc.

The camera unit 222 captures images in a forward direction of the mobile robot 100 according to a control signal of the control unit 210, in a moving or stopped state of the mobile robot 100 on a cleaning region. The camera unit 222 includes a single camera 110, and is fixedly installed at the mobile robot 100 so as to capture an upward image, i.e., the ceiling. In a case that the camera unit 222 is rotatable in upper and lower directions or in right and left directions, images can be captured in upper and lower directions and in right and left directions of the peripheral regions as well as the ceiling.

In the present invention, the camera unit 222 captures ceiling images at predetermined time intervals while moving according to the control signal. In this case, it is preferable to control the time interval so that a plurality of same feature points can be included in two neighboring images.

The control unit 210 includes a feature point extractor 211 configured to extract feature points from the ceiling images captured by the camera 110, a particle generator 212 configured to generate feature point particles from a first image based on feature points extracted from the two neighboring ceiling images sequentially captured, and a 3D information processor 213 configured to make a 3D map by extracting 3D information of a feature point of the first image by projecting the generated particles to a second image.

The agitator is rotatably installed at the mobile robot 100, and brushes foreign materials such as dusts or dirties on the floor so that the foreign materials can be smoothly sucked into the suction module 240.

The driving unit 230 transmits a driving force to left and right wheels of the mobile robot 100 according to a signal transmitted from the control unit 210. According to a driving of the left and right wheels, the mobile robot 100 can move to a front side. The left wheel receives a driving force generated by the first motor 231, whereas the right wheel receives a driving force generated by the second motor 232.

The suction module 240 consists of a dust accommodation means 241, a suction means 242, a suction duct (not shown), a filter (not shown) and a suction opening (not shown), thereby sucking and accommodating therein foreign materials on the floor.

The manipulation unit 150 may include a button or key type of setting unit 280 configured to input a command for controlling the mobile robot 100. Near the manipulation unit 150, may be installed a display unit 270 configured to display each kind of information of the mobile robot 100. The display unit 270 may be installed on the manipulation unit 150.

The battery supplies a driving force to the driving unit 230, etc. This battery may be charged from a charging plate (not shown). The front sensor 120 may detect an obstacle disposed at a front side of a movement path of the mobile robot 100.

The feature point extractor 211 is configured to extract feature points from the captured ceiling images, by receiving the ceiling images captured by the camera unit 222 and by processing the received ceiling images. The feature point extractor 211 performs an image processing by receiving captured images and then converting the received images into frequency regions. The feature point extractor 211 determines an object or a region having a large frequency variation width as a feature point. In this case, the feature points may include ceiling edges, corners, a lamp, etc. The extracted feature points are stored in the storage unit 260 according to each image frame.

Once the feature points are extracted from the two ceiling images sequentially captured by the camera unit 222, the particle generator 212 matches the same feature points of the two images with each other, and then generates feature point particles from the first image (firstly-captured image).

The 3D information processor 213 projects the generated particles to the second image (secondly-captured image) which has undergone the feature point matching, thereby determining a particle having a highest matching possibility among the projected particles as a substantial feature point of the surroundings. Then, the 3D information processor 213 extracts 3D information of the substantial feature point, and makes a 3D map of the surroundings.

The driving unit 230 drives the first and second motors 231, 232 according to a control signal outputted from the control unit 210, thereby moving the mobile robot 100. The first and second motors 231, 232 of the driving unit 230 are connected to left and right wheels of the mobile robot 100. Therefore, the mobile robot 100 is moved in back and forth directions and in right and left directions according to rotation speeds and rotation directions of the first and second motors 231, 232.

The position detection unit 250 detects position change by motion of the mobile robot 100, and is attached to one side of the wheel to detect an rpm of the wheel. Based on the rpm of the wheel, a movement controller 212 may detect a spacing degree of the mobile robot 100 from the initial position. In this case, the position detection unit 250 preferably includes an encoder.

The storage unit 260 consists of a non-volatile memory device such as an EEPROM or a flash memory, and stores therein an operation program for driving the mobile robot 100. Furthermore, the storage unit 260 stores therein image information sensed by the detection unit 220, feature points extracted from the image information, and position information of the mobile robot 100 detected by the position detection unit 250.

Figure 3:
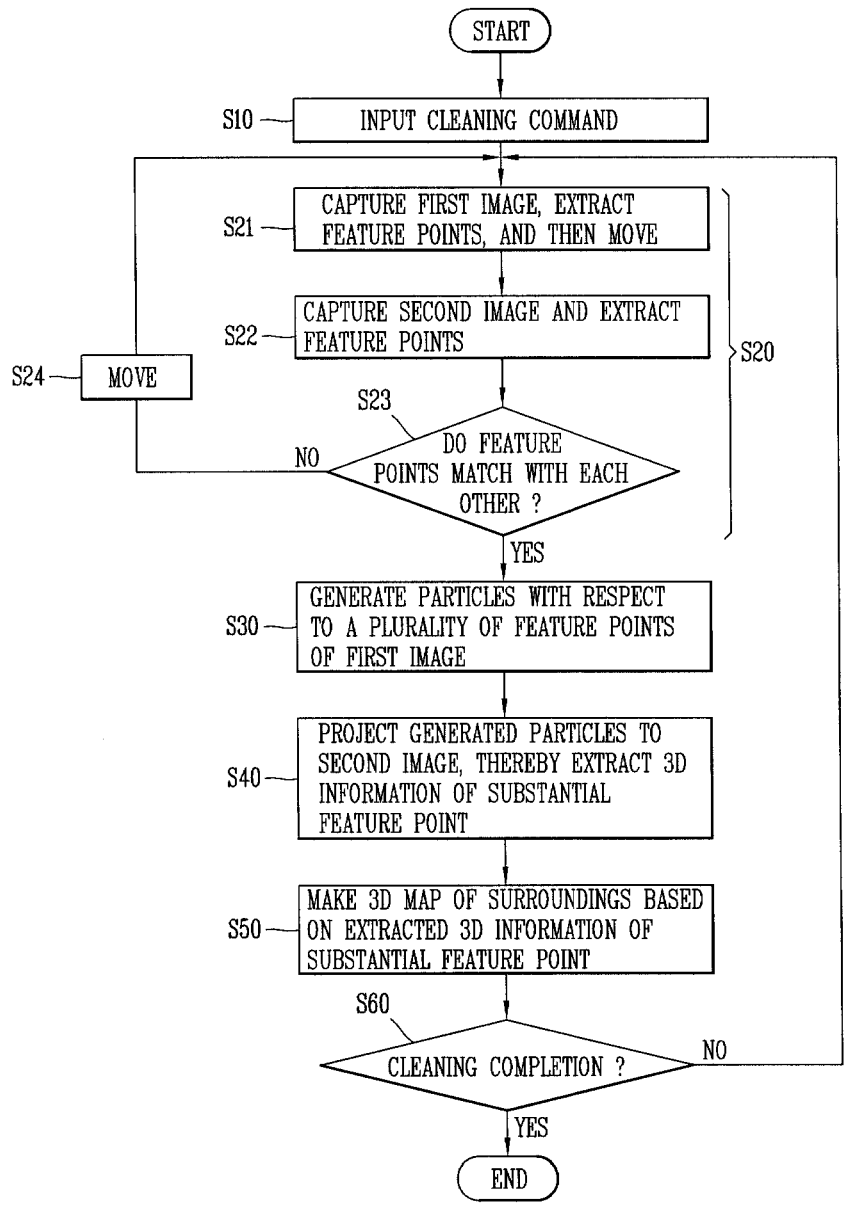
FIG. 3 is a flowchart showing a method for recognizing 3D surroundings of the mobile robot with a single camera according to one embodiment of the present invention.
Figure 4:
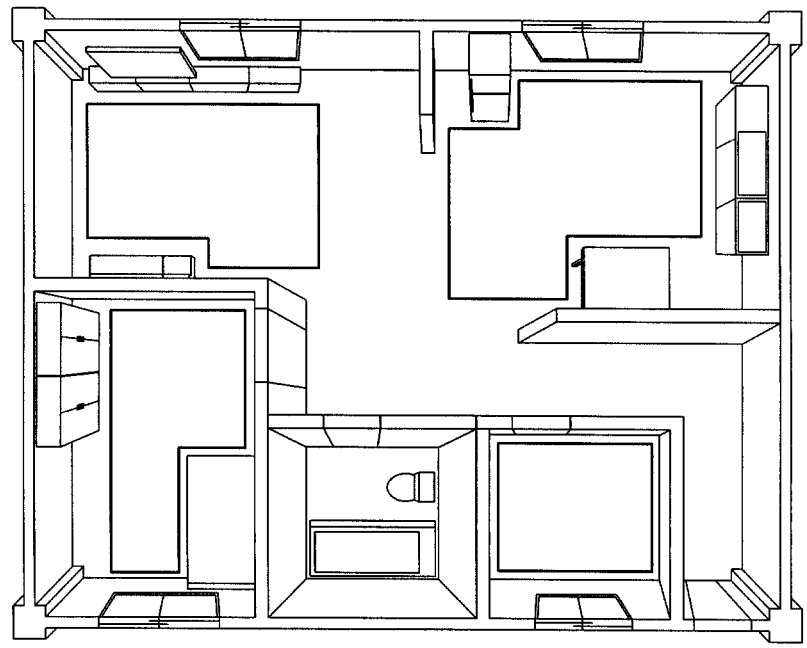
FIG. 4 is a view showing a region to be cleaned by the mobile robot according to the present invention.
Figure 5:
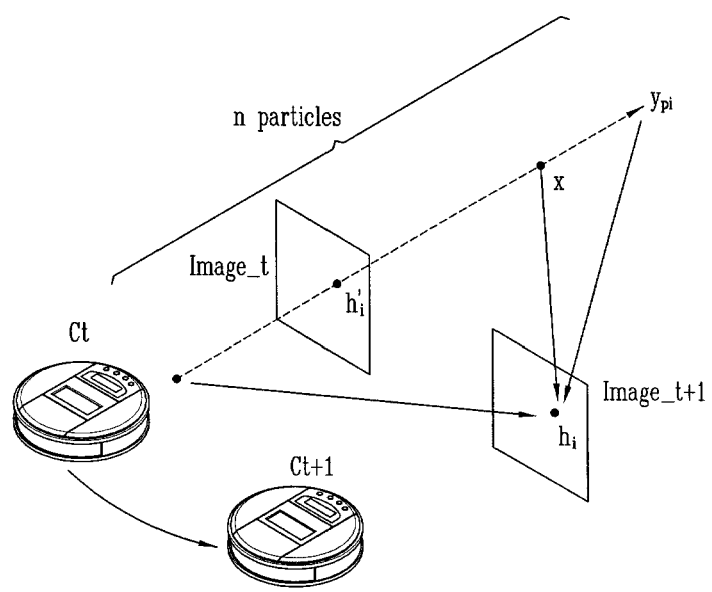
FIG. 5 is a view to explain a process for recognizing 3D surroundings of the mobile robot with a single camera according to the present invention.
Figure 6:
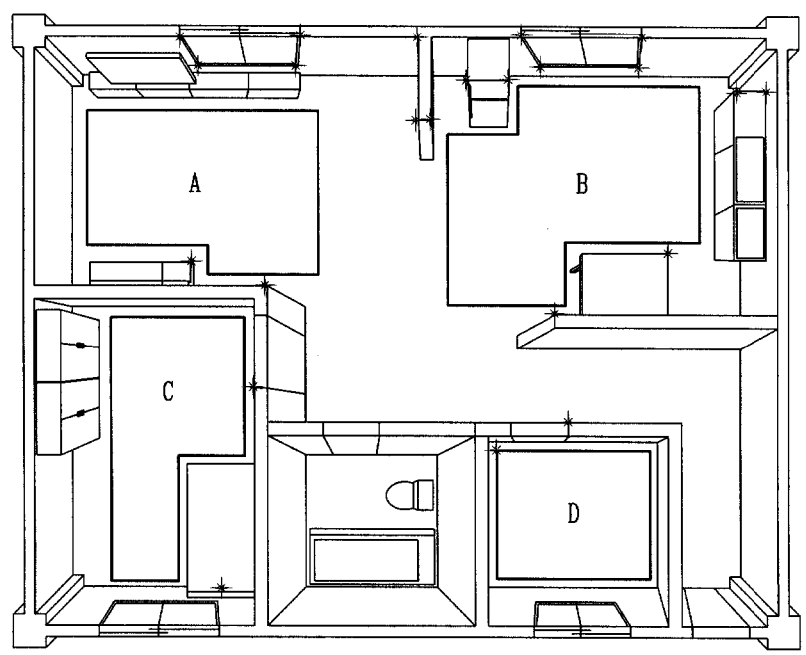
FIG. 6 is a view of a final map of an entire region.

FIG. 3 is a flowchart showing a method for recognizing 3D surroundings of the mobile robot with a single camera according to one embodiment of the present invention, FIG. 4 is a view showing a region to be cleaned by the mobile robot according to the present invention, FIG. 5 is a view to explain a process for recognizing 3D surroundings of the mobile robot with a single camera according to the present invention, and FIG. 6 is a view of a final map of an entire region. Here, FIG. 5 shows a concept of a particle re-projection for generating particles from any feature point among feature points extracted from an image captured at a time (t), and projecting the generated particles to an image captured at a time (t+1).

Referring to FIG. 3, a method for recognizing 3D surroundings of a mobile robot with a single camera comprises: a feature point processing step (S20) of calculating matching information of the same feature points of two neighboring images, by extracting a plurality of feature points from each surrounding image sequentially captured with using the single camera; generating a preset number of particles on a virtual line based on the matching information, the virtual line passing through a feature point of a first image of the two neighboring images and a center of the camera (S30); extracting 3D information of a substantial feature point of the surroundings by projecting the generated particles to a second image of the two neighboring images (S40); and estimating a position of the mobile robot in the surroundings and making a 3D map based on the 3D information (S50).

In S50, a position of the mobile robot in the surroundings is estimated and a 3D map is made by repeatedly performing the steps S20, S30 and S40 on the cleaning region.

With reference to FIGS. 3 to 6, will be explained the method for recognizing 3D surroundings of a mobile robot with a single camera according to one preferred embodiment of the present invention.

In S20, the mobile robot 100 captures a first ceiling image at a time (t) with using the camera 110 fixedly-mounted to an upper part thereof. Then, the feature point processor 211 receives the captured first image, extracts feature points from ceiling edges, corners, a lamp, etc., and stores the extracted feature points in the storage unit 260 according to each frame (S21). Then, the mobile robot moves to perform a cleaning process for a predetermined time. Next, the mobile robot 100 captures a second ceiling image at a time (t+1) with using the camera 110. Then, the feature point processor 211 receives the captured second image, extracts feature points from ceiling edges, corners, a lamp, etc., and stores the extracted feature points in the storage unit 260 according to each frame (S22). Then, the mobile robot moves to perform a cleaning process for a predetermined time. In this case, the second ceiling image preferably includes a plurality of same feature points as those of the first ceiling image.

Upon extracting feature points from at least two neighboring ceiling images, the mobile robot 100 matches the same feature points extracted from each image with each other (S23).

In case of matching the feature points of the images with each other, position information of the camera is required. In the preferred embodiment, since the camera is a single camera fixedly-installed to an upper part of the mobile robot, movement information of the camera may be calculated from movement information of the mobile robot. That is, movement information of the mobile robot corresponds to movement information of the camera.

When the number of feature points matching with each other is not sufficient, new images may be captured or feature points may be extracted from the captured images.

More concretely, the mobile robot 100 obtains a first image of the surroundings while performing a cleaning process with respect to the surroundings, thereby extracting feature points of the first image. If the number of the feature points of the extracted first image is more than a reference value, the mobile robot 100 moves to the surroundings for a predetermined time thus to obtain a second image. Then, the mobile robot 100 extracts feature points from the second image. In order to match the feature points extracted from the two images with each other, the movement information of the camera is required. Accordingly, the movement information of the mobile robot is calculated. If there exist two or more images from which feature points having the number more than the reference value have been extracted, the feature points of the first and second images are matched with each other based on the movement information of the mobile robot.

As a matching result of the feature points, the particle generator 212 generates particles with respect to a plurality of feature points extracted from a first image of the two images sequentially captured (S30).

Referring to FIGS. 5 and 6, in S30, assumed is a virtual line ($y_{pi}$) including a feature point ($h'_i$) of the first image (Image_t) and a center of the camera, and a limited number (n) of particles are generated on the virtual line.

More concretely, once the camera captures a substantial feature point (X) of the surroundings at a time (t), the substantial feature point (X) is implemented as a feature point ($h'_i$) of the first image (Image_t). Accordingly, if the center of the camera and the feature point of the image are connected to each other, the substantial feature point (X) is implemented on the virtual line. The particles include the substantial feature point (X), and the number of the particles is limited for calculative convenience.

The virtual line ($y_{pi}$) may be expressed as a vector as shown in the following equation 1).

$$y_{pi} = \begin{pmatrix} r_i^W \\ \hat{h}_i^W \end{pmatrix} \quad (1)$$

Here,
$r_i^W$
represents a vector indicating a position of the center of the camera, and
$\hat{h}_i^W$
represents a unit vector indicating a direction of the center of the camera towards a feature point.

The 3D information processor 213 projects the generated particles to the second image (Image_t+1) so that the substantial feature point ($h_i$) can be included in the second image (Image_t+1).

In the preferred embodiment, it is assumed that the preset number of particles is initially set to have the same interval and the same weight on the virtual line, and the preset number of particles generated from the first image include the substantial feature point.

In S40, calculated is each matching probability of the preset number of particles projected to the second image with the substantial feature point. Then, a particle having a highest probability among the calculated probabilities is selected to obtain a height of the substantial feature point.

In S50, it is determined whether a bottom map of the created 3D map forms a closed curved line. If the bottom map does not form a closed curved line, a starting point and an ending point of the bottom map are connected to each other to compensate for the created map.

For instance, if particles of two feature points (a, b) of the image captured at a time (t) are projected to the image captured at a time (t+1), a probability of projecting the particles of the two feature points (a, b) to the particles of the same feature points (a, b) is the highest.

After making a map of one region (A) shown in FIG. 6, the mobile robot determines whether a starting point thereof is the same as an ending point.

If the starting point is different from the ending point as a result of the determination, the mobile robot compensates for the created map by making the movement path in a closed curved line. The reason why the movement path is made to form a closed curved line is because there may occur errors in determining positions of the mobile robot even if the entire map is gradually completed by compensating for the partial maps. Therefore, the final map may have errors removed therefrom by compensating for the partial maps so that the movement path can form a closed curved line.

Once the processes for making the map of said one region (A) are equally applied to another regions (B, C, D), the entire map of the plurality of divided regions is completed.

It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

The invention claimed is:

1. A mobile robot with a single camera, comprising:
a detection unit having a single camera, and configured to sequentially capture images of different locations in a cleaning region using the single camera; and
a control unit configured to extract feature points from the sequentially-captured images, to match at least one same feature point of two neighboring images, and to extract 3D information of at least one real feature point, wherein the at least one real feature point is represented by the at least one same feature point,
wherein the control unit generates a plurality of particles on a virtual line, projects the generated particles to a second image of the two neighboring images, and extracts 3D information of the at least one real feature point based on a correlation between the projected particles and the at least one same feature point of the second image, and
wherein the virtual line passes through both a center of the camera and the at least one real feature point of a first image of the two neighboring images.

2. The mobile robot with a single camera of claim 1, wherein the control unit is configured to make a 3D map by extracted 3D information.

3. The mobile robot with a single camera of claim 1, wherein the control unit estimates a position of the mobile robot in the surroundings and make a 3D map by repeatedly performing, on the cleaning region, the step of generating the plurality of particles on the virtual line, and the step of extracting 3D information of the at least one real feature point of the surroundings.

4. The mobile robot with a single camera of claim 3, wherein the control unit comprises:

a feature point extractor configured to extract feature points from the captured images;
a particle generator configured to generate the plurality of particles on the virtual line based on feature points extracted from two neighboring images sequentially captured; and
a 3D information processor configured to make a 3D map by extracting 3D information of the at least one same feature point by projecting the generated particles to the second image.

5. The mobile robot with a single camera of claim 4, further comprising:
a position detection unit configured to detect position information varied according to movement of the mobile robot; and
a storage unit configured to store therein an operation program for driving the mobile robot, and configured to store at least one of image information sensed by the detection unit, feature points extracted from the image information, position information of the mobile robot detected by the position detection unit, estimation information, and the 3D map.

6. The mobile robot with a single camera of claim 1, wherein the detection unit comprises:
a sensor unit configured to sense an obstacle by using a signal, or configured to determine a movement path; and
a camera unit configured to capture images including a ceiling in a moving or stopped state on the cleaning region.

7. The mobile robot with a single camera of claim 1, wherein the camera is fixedly-installed to an upper side of the mobile robot to obtain a ceiling image.

8. The mobile robot with a single camera of claim 1, wherein the plurality of particles have the same interval on the virtual line.

9. A method for recognizing 3D surroundings of a mobile robot with a single camera, the method comprising:
a feature point processing step of calculating matching information of at least one same feature points of two neighboring images, by extracting a plurality of feature points from each surrounding image sequentially captured from different locations in a cleaning region using the single camera;
generating a plurality of particles on a virtual line based on the matching information, wherein the virtual line passes through both a center of the camera and at least one real feature point of a first image of the two neighboring images, wherein the at least one real feature point is represented by the at least one same feature point;
projecting the generated particles to a second image of the two neighboring images; and
extracting 3D information of the at least one real feature point based on a correlation between the projected particles and the at least one same feature point of the second images.

10. The method of claim 9, wherein the plurality of particles are to have the same interval and the same weight on the virtual line.

11. The method of claim 10, wherein the particles comprise the at least one real feature point of the surroundings.

12. The method of claim 9, wherein the step of extracting 3D information comprises:
calculating each matching probability of the plurality of particles projected to the second image with the real feature point; and
selecting a particle having a highest probability among the calculated probabilities thereby obtaining a height of the real feature point.

13. The method of claim 9, wherein the feature point processing step comprises:
obtaining a first image of the surroundings while performing a cleaning process with respect to the surroundings, thereby extracting feature points of the first image;
if the number of the feature points of the extracted first image is more than a reference value, moving the mobile robot to the surroundings for a predetermined time, then obtaining a second image thereby extracting feature points from the second image, and calculating movement information of the mobile robot; and
if there exist two or more images from which feature points having the number more than the reference value have been extracted, matching the feature points of the first and second images with each other based on the movement information of the mobile robot.

14. The method of claim 13, wherein in a case that the camera is fixedly-installed to the mobile robot, movement information of the camera is calculated from movement information of the mobile robot.

15. The method of claim 9, further comprising storing said one or more images captured from the surroundings, the extracted feature points, the matching information of the feature points, and the 3D information of the extracted feature points.

16. The method of claim 9, wherein the feature points comprise at least one of ceiling edges, corners, and a lamp.

17. The method of claim 9, further comprising:
estimating a position of the mobile robot in the surroundings and making a 3D map based on the 3D information.

18. The method of claim 17, wherein in the step of making the 3D map, the position of the mobile robot in the surroundings is estimated, and the 3D map is made by repeatedly performing, on a cleaning region, the feature point processing step, the particle generating step, and the 3D information extracting step.

19. The method of claim 17, wherein the step of making a 3D map comprises:
determining whether a bottom map of the created 3D map forms a closed curved line; and
connecting a starting point and an ending point of the bottom map to each other if the bottom map does not form a closed curved line.

* * * * *